United States Patent
Guo et al.

(10) Patent No.: US 7,409,536 B2
(45) Date of Patent: Aug. 5, 2008

(54) COMPUTER SYSTEMS WITH SEVERAL OPERATING SYSTEMS COEXISTING THEREON AND SWAPPING BETWEEN THESE OPERATING SYSTEMS

(75) Inventors: Xiao Bing Guo, Beijing (CN); Zhe Peng Wang, Beijing (CN); Tian Shu Wang, Beijing (CN); Hui Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 11/061,396

(22) Filed: Feb. 18, 2005

(65) Prior Publication Data

US 2005/0182922 A1    Aug. 18, 2005

(30) Foreign Application Priority Data

Feb. 18, 2004   (CN)   .................. 2004 1 0005430

(51) Int. Cl.
*G06F 9/445* (2006.01)
*G06F 15/177* (2006.01)

(52) U.S. Cl. ............... 713/1; 713/2; 713/100; 714/2; 714/11

(58) Field of Classification Search .......... 713/1, 713/2, 100; 719/311–332; 718/1–108
See application file for complete search history.

(56) References Cited

U.S. PATENT DOCUMENTS

| | | | | |
|---|---|---|---|---|
| 4,843,541 A | | 6/1989 | Bean et al. .................. 364/200 |
| 5,659,756 A | | 8/1997 | Hefferon et al. ............ 395/726 |
| 5,675,795 A | | 10/1997 | Rawson, III et al. ........ 395/652 |
| 5,758,174 A | * | 5/1998 | Crump et al. ............... 713/323 |
| 5,805,790 A | * | 9/1998 | Nota et al. .................... 714/10 |
| 6,175,917 B1 | * | 1/2001 | Arrow et al. .................. 713/1 |
| 6,226,734 B1 | | 5/2001 | Kleinsorge et al. ............ 712/13 |
| 6,247,109 B1 | | 6/2001 | Kleinsorge et al. ............ 712/13 |
| 6,532,538 B1 | | 3/2003 | Cronk et al. ................... 713/2 |
| 6,662,284 B2 | * | 12/2003 | Gold .......................... 711/163 |
| 6,711,605 B2 | * | 3/2004 | Sekiguchi et al. ........... 718/100 |
| 6,772,419 B1 | * | 8/2004 | Sekiguchi et al. ........... 719/319 |
| 6,931,640 B2 | * | 8/2005 | Asano et al. ................ 718/104 |
| 6,996,706 B1 | * | 2/2006 | Madden et al. ................ 713/2 |
| 6,996,828 B1 | * | 2/2006 | Kimura et al. .............. 719/319 |
| 7,127,596 B2 | * | 10/2006 | Rich et al. ..................... 713/1 |
| 7,290,259 B2 | * | 10/2007 | Tanaka et al. .................. 718/1 |
| 2001/0018717 A1 | * | 8/2001 | Shimotono .................. 709/319 |
| 2002/0013802 A1 | * | 1/2002 | Mori et al. ..................... 709/1 |

(Continued)

*Primary Examiner*—Nitin C Patel
(74) *Attorney, Agent, or Firm*—Louis P. Herzberg

(57) ABSTRACT

Computer systems in which at least two operating systems coexist independently from each other, and that swap between the operating systems. Provides methods to have at least two operating systems coexist independently of each other and swap the operating systems. A computer system includes a memory allocation component to be called by a power-on self test (POST) routine in order to allocate RAM for the operating systems when the computer system starts up, and backup and restore component to be called by a suspension routine in order to backup and restore the data specific to the operating systems, wherein each of the operating systems can transfer itself to the memory area belonging to itself, turn an allocated memory area into a physical RAM, and call the suspension routine to swap to other operating systems by setting swap parameters. The computer system can swap between operating systems easily and conveniently.

25 Claims, 11 Drawing Sheets

U.S. PATENT DOCUMENTS

2002/0188704 A1* 12/2002 Gold et al. .................. 709/221
2002/0188836 A1* 12/2002 Gurumoorthy et al. ......... 713/1
2002/0188887 A1   12/2002 Largman et al.
2003/0115443 A1    6/2003 Cepulis et al.
2004/0205755 A1* 10/2004 Lescouet et al. ............ 718/100

* cited by examiner

| 1st OS ( including its boot loader & suspension routine ) | 260 |
| --- | --- |
| ⋮ | |
| 2nd OS ( including its boot loader & suspension routine ) | 250 |
| ⋮ | 240 |
| Basic Input Output System ( BIOS ) | 230 |
| 1st OS-specific data backup area | 220 |
| 2nd OS-specific data backup area | 210 |
| ⋮ | |
| Memory Area of Setting of Currently Running System ( IVT, System Hardware Information Set by BIOS and OS ) | |

Fig. 2

COMPUTER SYSTEMS WITH SEVERAL OPERATING SYSTEMS COEXISTING THEREON AND SWAPPING BETWEEN THESE OPERATING SYSTEMS

TECHNICAL FIELD

The invention relates to a computer system with several operating systems (OSs) coexisting thereon independently from each other and swapping thereof. Specifically. More particularly, the invention relates to a computer system in which at least two operating systems coexist independently from each other and that swaps between the operating systems and a method to have at least two operating systems coexisting independently from each other and swap the operating systems.

BACKGROUND TECHNOLOGY

Rapid developments of information technology coming one after another cause technical problems that are difficult to solve in the field of computers. An example is the revelation of more and more of computer virus and program bugs. The development and prevalence of network technology gives the spread of computer virus a further boost. Besides, the widespread of computer usage provides many users uninformed about computers opportunities to contact and utilize computers. Due to such users' incorrect handling, the crash of computer systems used by them is inevitable. All these make the management of computers more and more important.

In particular, the currently popular i386-based PC operating systems such as MS Windows are susceptible to virus attack or crash due to deletion of files or formatting of logical disk drives. When the computer system is corrupted, the user usually cannot restart Windows any more or run diagnostics to recover the system. A survey shows that half of IT cost is due to system recovery. Thus, how to protect against such computer disasters is one of the key issues to meet users' requirement and lower IT cost.

To solve the aforementioned problems, the prior art employs such approaches as listed below to store/recover the main operating system when the system crashes or otherwise goes abnormal, e.g. being affected by virus or memory leak.

1. System management application in the main operating system. This technology has some inherent disadvantages since it depends on the main operating system. Therefore, when MS Windows as the main operating system is corrupted, for example, all applications cannot run. Therefore the system management application cannot achieve effective management when big trouble occurs. For example, when Blue Screen of Death happens, no application can be run in a normal way. When the core of Windows or memory is affected by virus, almost all anti-virus software will ask for a reboot from a clean system before they can work successfully.

2. Pre-Windows environment support. There are several approaches to extend the pre-Windows environment:
   Recovery/Bootable CD
   OS in hidden hard disk partition
   BIOS (Basic Input Output System) enhancement applications (e.g. Phoenix Firstware)
      All of these can provide system management functions in a pre-Windows environment. However, the main problem still exists, i.e. the user must reboot the computer, which causes not only a long wait time but also troublesome operations such as closing applications.
3. Hypervisor solution. Hypervisor is a virtual simultaneous running mechanism for operating systems. Under such a mechanism, a base operating system virtualizes all hardware resources to run another operating system. Since there are two operating systems running hierarchically, this mechanism will inevitably reduce system performance in a significant way.

SUMMARY OF INVENTION

Thus, in view of these problems, an aspect of the invention it to provide a computer system in which at least two operating systems coexist independently from each other and that swaps between the operating systems and another aspect is to provide methods to have at least two operating systems coexisting independently from each other and swap the operating systems.

To achieve the above and other aspects, the invention provides a computer system, in which at least two operating systems (OSs) coexist independently from each other and that swaps between the operating systems, including a random access memory (RAM) and a basic input output system (BIOS) stored in read-only memory (ROM), with the BIOS including a power-on self test (POST) routine, each of the operating systems including a boot loader routine and a suspension routine, and the computer system further including: an operating system swap core in the BIOS that includes a memory allocation component to be invoked by the POST routine upon the computer system startup to allocate a RAM area for each of the operating systems, and a backup and restore component to be invoked by the suspension routine to backup and restore the data specific to each of the operating systems, wherein each of the operating systems further includes a boot loader patch routine to transfer the corresponding operating system to the memory area allocated by the operating system swap core and set the allocated memory area as a physical memory available for the operating system; and each of the operating systems further includes a swap routine to set swap parameters and invoke the suspension routine in the corresponding operating system to give system control to the operating system swap core.

The invention also provides methods for hosting at least two operating systems independently from each other on a computer system and swapping between the operating systems, with the computer system including a RAM and a BIOS stored in a ROM and the BIOS including a POST routine, each of the operating systems including a boot loader routine and a suspension routine.

BRIEF DESCRIPTION OF DRAWINGS

The invention will be better understood by the detailed description below in conjunction with drawings. Throughout the drawings, like reference codes refer to the same units, wherein:

FIG. 2 is a map of memory architecture holding operating systems in RAM 120 according to the preferred embodiment of the invention;

DESCRIPTION OF THE INVENTION

Figure 1:
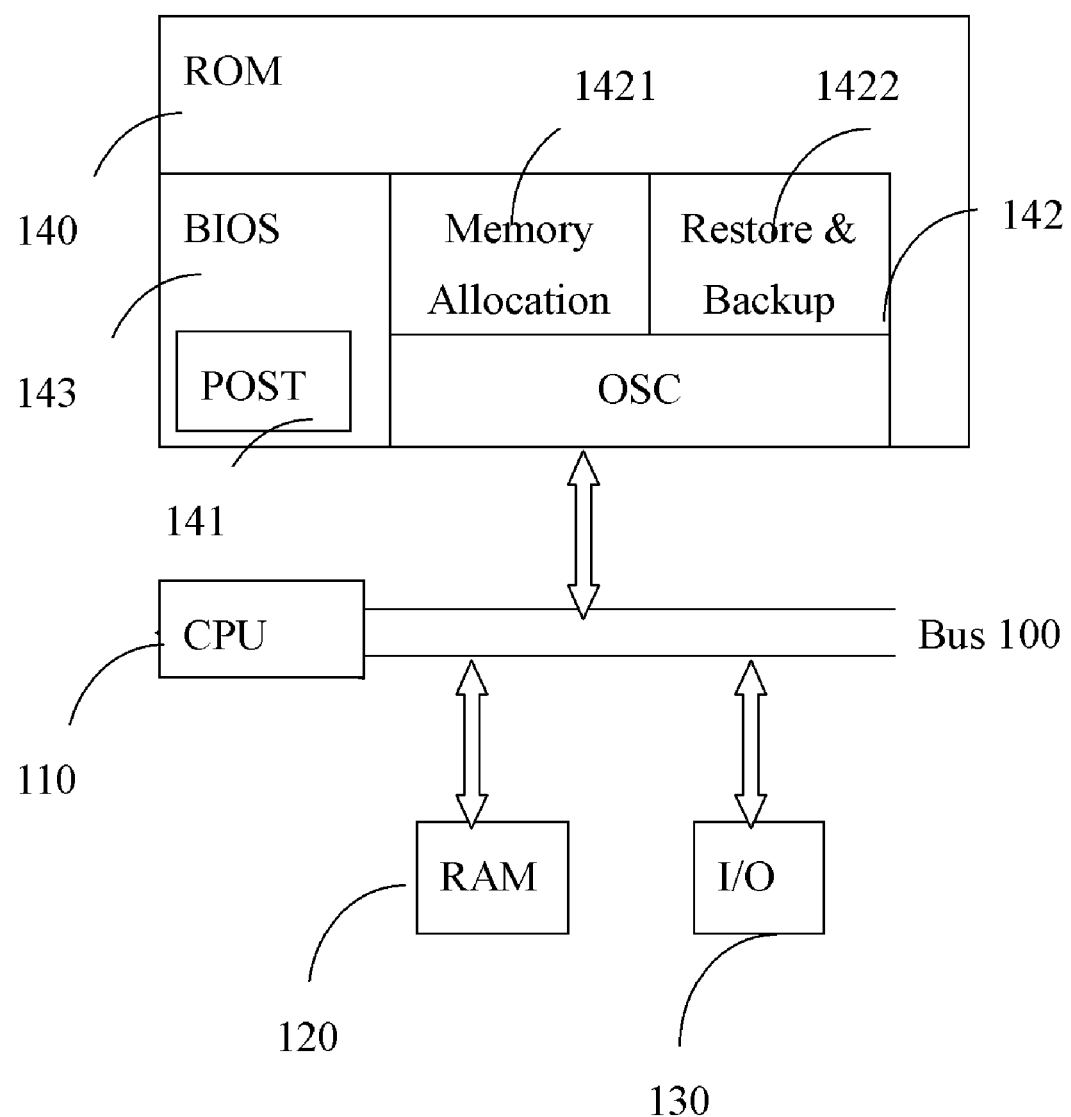
FIG. 1 is a block diagram showing the computer system of the invention.

The invention provides a computer system in which at least two operating systems coexisting independently of each other and that swaps between the operating systems, and also provides methods to have at least two operating systems coexisting independently from each other and swap the operating systems. Many state-of-the-art computers have a physical RAM of no less than 256 MB. Therefore, it is generally worthwhile to add into a service environment support of an operating system independent of other operating systems.

Thus the invention provides a computer system, in which at least two operating systems (OSs) coexist independently from each other and that swaps between the operating systems, including a random access memory (RAM) and a basic input output system (BIOS) stored in read-only memory (ROM), with the BIOS including a power-on self test (POST) routine, each of the operating systems including a boot loader routine and a suspension routine, and the computer system further including: an operating system swap core in the BIOS that includes a memory allocation component to be invoked by the POST routine upon the computer system startup to allocate a RAM area for each of the operating systems, and a backup and restore component to be invoked by the suspension routine to backup and restore the data specific to each of the operating systems, wherein each of the operating systems further includes a boot loader patch routine to transfer the corresponding operating system to the memory area allocated by the operating system swap core and set the allocated memory area as a physical memory available for the operating system; and each of the operating systems further includes a swap routine to set swap parameters and invoke the suspension routine in the corresponding operating system to give system control to the operating system swap core.

The invention also provides a method for hosting at least two operating systems independently of each other on a computer system and swapping between the operating systems, with the computer system including a RAM and a BIOS stored in a ROM and the BIOS including a POST routine, each of the operating systems including a boot loader routine and a suspension routine. An example of, and the method comprising the following steps: 1) providing an operating system swap core in the BIOS to allocate a RAM area for each of the operating systems upon the computer system startup and to be invoked by the suspension routine to backup and restore the data specific to each of the operating systems; 2) upon POST, using the operating system swap core to allocate in the RAM for each of the operating systems a respective operating system memory area as a RAM for the operating system; 3)after POST, using the operating system swap core to backup the original setting information of the computer system; 4) according to the original setting information, starting up a first operating system, which will transfer itself into the operating system memory area allocated to the first operating system; 5) using the operating system swap core to backup the current setting of the computer system, and then restoring the original setting information of the computer system, without POST and according to the original information starting up a second operating system , which will transfer itself into the operating system memory area allocated to the second operating system; 6) repeating step 4) to startup the remaining operating systems until all the operating systems have been sequentially started up; and 7) providing in the current operating system a swap routine to invoke the suspension routine to give control of the computer system to the operating system swap core in order to backup the current operating system preparing to suspension and restore the setting information for the computer system of another operating system ready to wake up, thus waking up the another operating system.

In an example embodiment of the invention, the first and the second operating systems that simultaneously coexist on the computer system are made by modifying conventional operating system so that the first operating system can transfer itself into the operating system memory area allocated to itself, and then the first operating system starts up the second operating system without POST and the second operating system transfers itself into the operating system memory area allocated to itself, and each operating system includes a swap routine to set swap parameters and invoke the suspension routine in respective operating system in order to give system control to the operating system swap core, thus allowing the computer system to swap between the first and the second operating systems and to swap between operating systems in a convenient and swift fashion.

The following is a detailed description of the invention in conjunction with the drawings. Details not given herein are well-known to those skilled in the art of conventional computer systems. FIG. 1 is a block diagram showing an example of an i386-based computer system of the invention. As shown in FIG. 1, the computer system of the invention includes a central processing unit (CPU) 110, a random access memory (RAM) 120, a input/output interface 130 and a read-only memory (ROM) 140. In ROM 140 is stored BIOS 143. Here, BIOS 143 includes a power-on self test (POST) component 141 and an operating system swap core (OSC) component 142. operating systemC 142 includes a memory allocation component 1421 to be invoked by the POST component upon the computer startup to allocate a memory areas for operating system, and a backup and restore component 1422 to be invoked by a suspension routine of operating system to backup and restore the environment for the operating system.

In this embodiment, RAM 120 can hold two operating systems. These two operating systems can be either the same kind of operating system or operating systems of different kinds, e.g. one MS Windows 2000 and the other Windows XP. The invention is not limited to the case where RAM 120 holds only two operating systems. Instead, it can hold more than two operating systems. The operating system of the invention includes a boot loader routine, a suspension routine and a swap routine with each boot loader routine further including a boot loader patch routine described later.

FIG. 2 is the map of memory architecture holding operating systems in RAM 120 according to the preferred embodiment of the invention. As shown in FIG. 2, the memory architecture with two operating systems comprises a computer system setting memory area 210, a second operating system-specific data backup area 220, a first operating system-specific data backup area 230, a BIOS image area 240, a second operating system memory area 250 and a first operating system memory area 260.

Here the computer system setting memory area is located at the lowest part of the memory to keep the interrupt vector table (IVT) of the currently running operating system (the first operating system or the second operating system), and the system hardware information set by BIOS and the operating system. The second operating system memory area 250 is typically located at a low memory to keep the second operating system. The first operating system memory area 260 is typically located at the highest memory to keep the first operating system. The first operating system-specific data backup area 230 and the second operating system-specific data backup area 220 are two areas isolated from the currently running operating system, and both are close to the BIOS image area 240. Here, the first operating system-specific data backup area 230 is used to keep the data copy of the computer system setting information for the first operating system while the second operating system-specific data backup area 220 is used to keep the data copy of the computer system setting information for the second operating system. Before the second operating system starts to run, system settings have to be restored from the second operating system-specific data backup area 220 to the computer system setting memory area 210. Similarly, before the first operating system starts to run, system settings have to be restored from the first operating system-specific data backup area 230 to the computer system setting memory area 210.

The first operating system and the second operating system are kept physically separated from each other. The low memory area keeping the second operating system, i.e. the second operating system memory area 250, and the high memory area keeping the first operating system, i.e. the first operating system memory area 260, are individually managed by BIOS 143 so that the second operating system cannot access the first operating system memory area 260.

Figure 3:
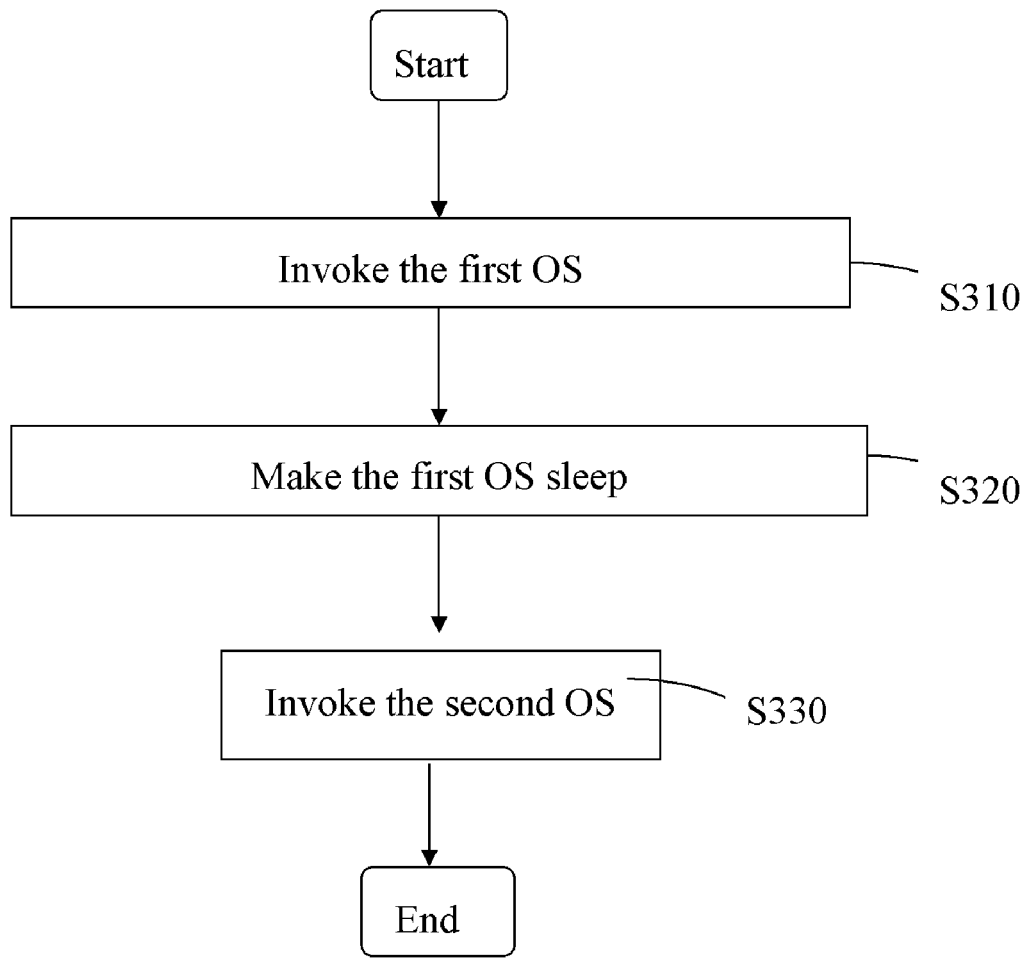
FIG. 3 shows a flowchart of the procedure of startup of the computer system with at least two operating systems coexisting independently from each other thereon and swapping between the operating systems according to the invention.

FIG. 3 shows the flowchart of the procedure of startup of the computer system with at least two operating systems coexisting independently of each other thereon and swapping between the operating systems according to the invention. Referring to FIG. 3, the first operating system startups up at S310. In this step, when PC is powered on, BIOS 143 will enter the POST procedure. After executing the POST procedure, the memory allocation component 1421 of BIOS 143 will backup the computer system setting information into the allocated second operating system-specific data backup area 220. Then the computer starts up the first operating system. The first operating system can transfer itself into the high memory area, i.e. the first operating system memory area 260. The procedure of this transference will be discussed later.

In S320 the first operating system is made to suspension. In this step, the first operating system still resides in its memory area, i.e. the first operating system memory area 260, while CPU 110 of the computer will lose the information related to this operating system. Then the control of CPU 110 is taken by BIOS 143.

In S330 the second operating system is started up. In this step, the backup and restore component 1142 of BIOS 143 will backup the computer system setting memory area 210 of the first operating system into the first operating system-specific data backup area 230. Then the backup and restore component 1142 of BIOS 143 restores the original computer setting information, i.e. the computer setting information in the second operating system-specific data backup area 220 is restored into the computer system setting memory area 210, and the first operating system memory area 260 is set as a memory hole, and then the master boot record (MSB) is loaded to startup the second operating system. In this case, the second operating system does not know that the first operating system already exists in the memory.

To enable the computer system to implement the abovementioned procedure, operating systemC 142 of BIOS 143 of the computer system (FIG. 1) has an additional indicator of SWAP_OS for operating system swapping. When swapping, SWAP_ON is set true; when really suspensioning, SWAP_ON is set false. operating systemC 142 has another additional indicator of INITIAL_SWAP to indicate whether it is the initial swap. If it is so, INITIAL_SWAP is set true; otherwise false.

The memory allocation component 1421 of BIOS 143 (FIG. 1) can set a operating system-specific RAM area in the memory to backup for suspensioning operating systems the computer system setting information, such as IVT, system hardware information set by BIOS and operating system (e.g. port image). In the preferred embodiment, memory allocation component 1412 sets the second operating system-specific data backup area 220 and the first operating system-specific data backup area 230.

The backup and restore component 1322 of BIOS 143 includes S3_SWAP (suspension swap) routine. This routine is invoked after the current operating system calls a _PTS (prepare to suspension) routine. S3_SWAP routine will operate differently according to different indicators.

Figure 4:
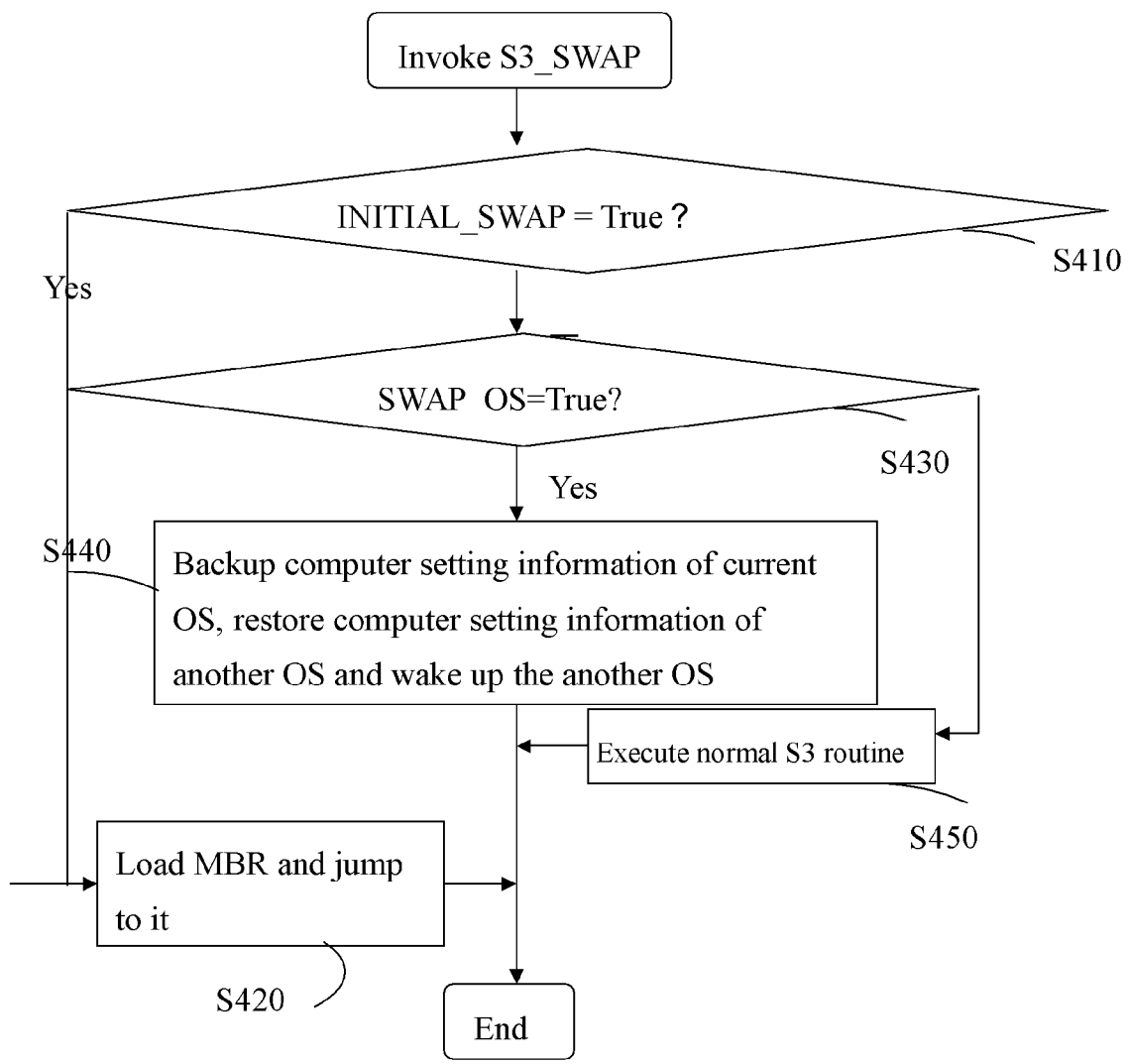
FIG. 4 shows a flowchart of S3_SWAP routine of the invention.

FIG. 4 shows the flowchart of S3_SWAP routine. Referring to FIG. 4, this routine carries out the following procedure:

In S410, determine whether INITIAL_SWAP is true. If it is true, at S420 load the MBR of hard disk (not shown) into RAM 120 via input/output interface 130, and then jump to the MBR.

At S430, if INITIAL_SWAP is false, determine whether SWAP_ON is true. At S440, if SWAP_ON is true, backup the computer system setting of current operating system into the corresponding operating system-specific data backup area, and then restore the computer system setting of another operating system and wake the another operating system.

At S450, carry out the normal suspension routine. Thus S3_SWAP is ended.

In an ACPI-enabled (Advanced Configuration and Power Interface) computer system, the abovementioned operating systemC 142 may be implemented by modifying and setting the content in BIOS.

It should be noted that the system must be provided with the power management which includes the suspension function, such as ACPI, so that the operating system have the suspension function, allowing for the abovementioned functions.

Besides, to implement the startup procedure of the computer system with at least two operating systems coexisting independently of each other thereon and swapping between the operating systems, the normal boot loader routine of operating system has to be modified and added with a swap routine.

Figure 5A:
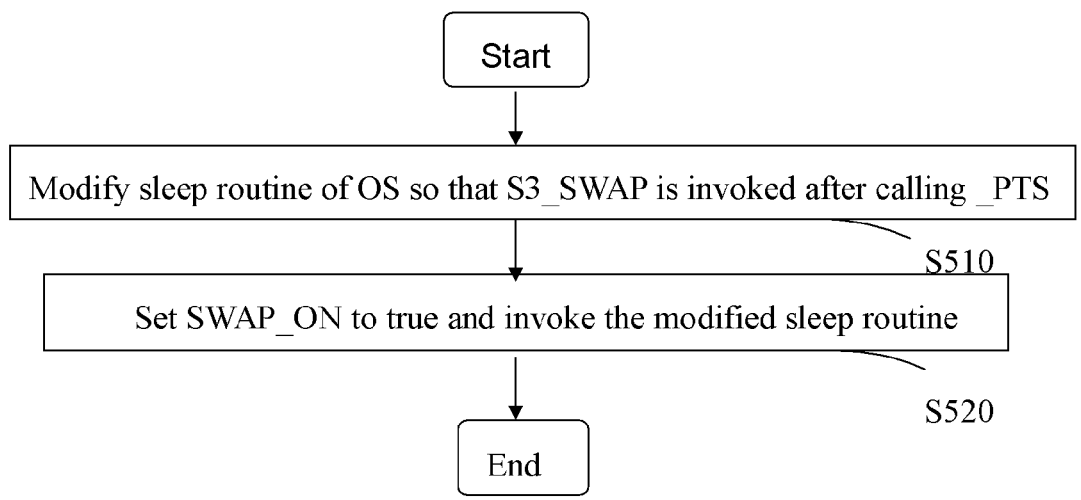
FIG. 5A shows a flowchart of the swap routine of the first operating system of the invention.
Figure 5B:
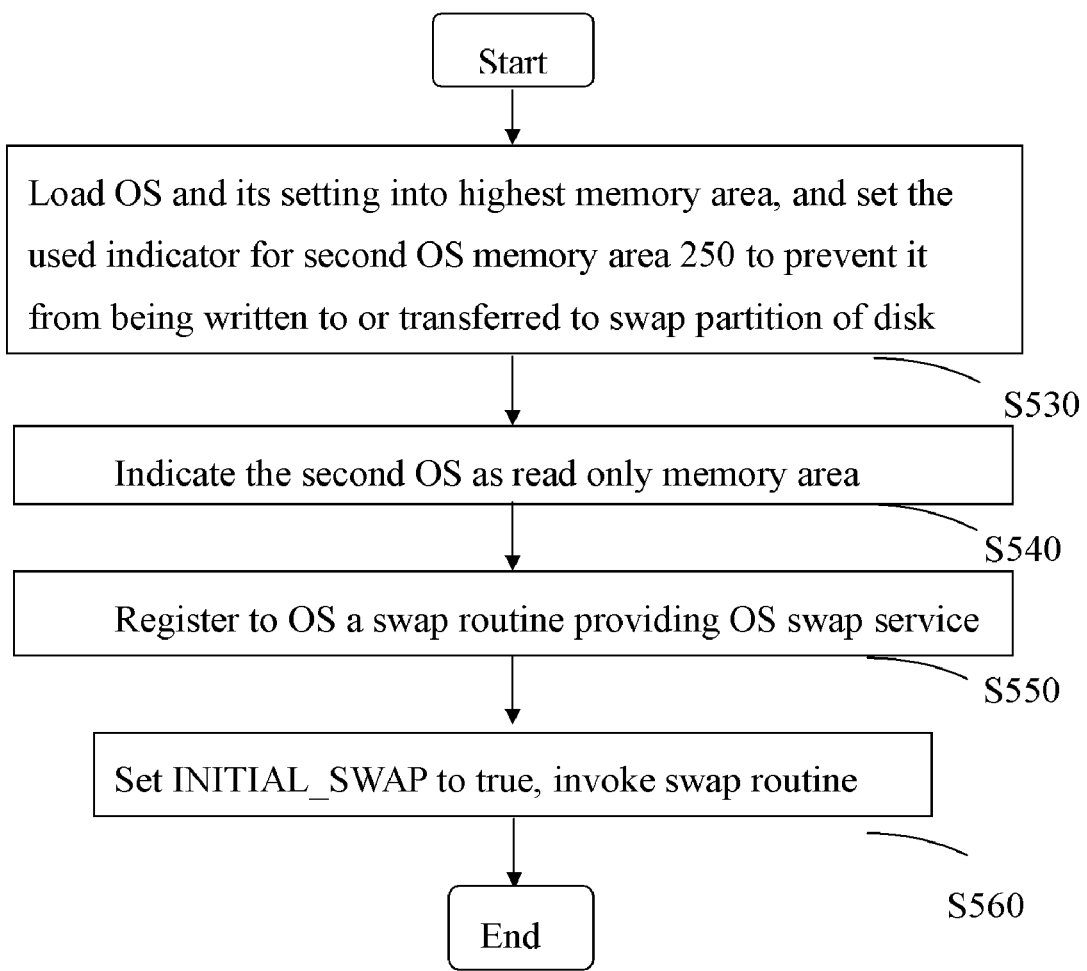
FIG. 5B shows a flowchart of a boot loader patch routine of the first operating system of the invention.

FIGS. 5A and 5B shows the flowchart of the modification of a common operating system into the first operating system. FIG. 5A shows the flowchart of the swap routine of the first operating system while FIG. 5B shows the flowchart of a boot loader patch routine of the first operating system.

Referring to FIG. 5A, at S510, modify the suspension routine of common operating system so that S3_SWAP of BIOS will be invoked after calling _PTS. At S520, set SWAP_ON to true and invoke the modified suspension routine.

Referring to FIG. 5B, at S530, the common operating system loads itself and/or moves to the highest memory area (i.e. the first operating system memory area 26) allocated by the memory allocation component in RAM, and indicates the second operating system memory area 250 as being in use to prevent the second operating system memory area 250 from being written by the first operating system or being transferred to a swap partition on disk.

At step S540, indicate the second operating system memory area as a memory area read only by some system management applications, e.g. virus diagnostics may scan this memory area.

At S550, register to the first operating system the swap routine that provides operating system swap service.

At S660, set INITIAL_SWAP to true, and then invoke the swap routine.

Figure 6A:
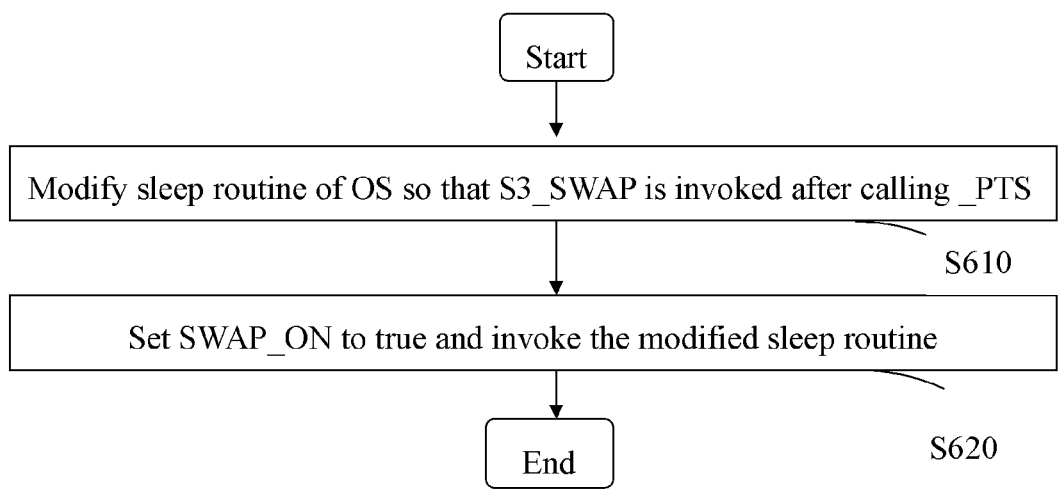
FIG. 6A shows a flowchart of the swap routine of the second operating system of the invention.

FIG. 6A shows the flowchart of the swap routine of the second operating system. Referring to FIG. 6A, at S610, modify the suspension routine of this common operating system so that S3_SWAP of BIOS will be invoked after calling _PTS. At S620, set SWAP_ON to true and invoke the modified suspension routine.

Figure 6B:
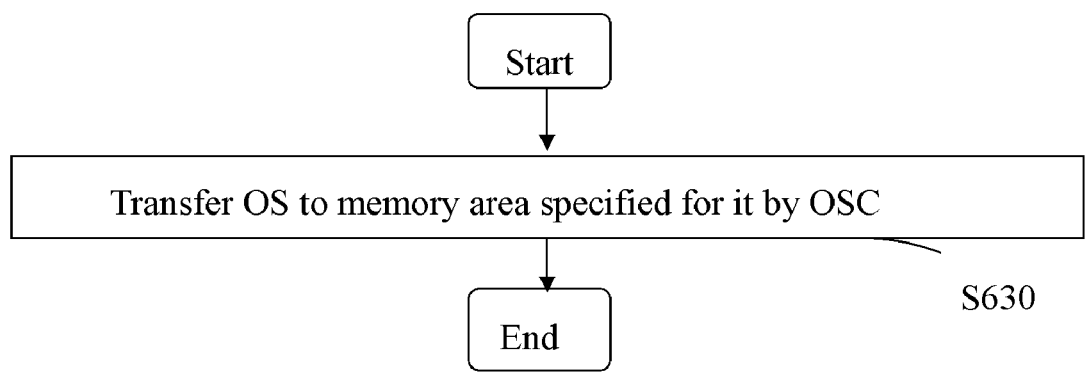
FIG. 6B shows a flowchart of the boot loader patch routine of the second operating system of the invention.

FIG. 6B shows the flowchart of the boot loader patch routine of the second operating system. Referring to FIG. 6B, at S630, transfer the operating system itself to the main operating system memory area 250 allocated by operating systemC 142. Then carry out the normal boot loader routine of the main operating system.

Figure 7:
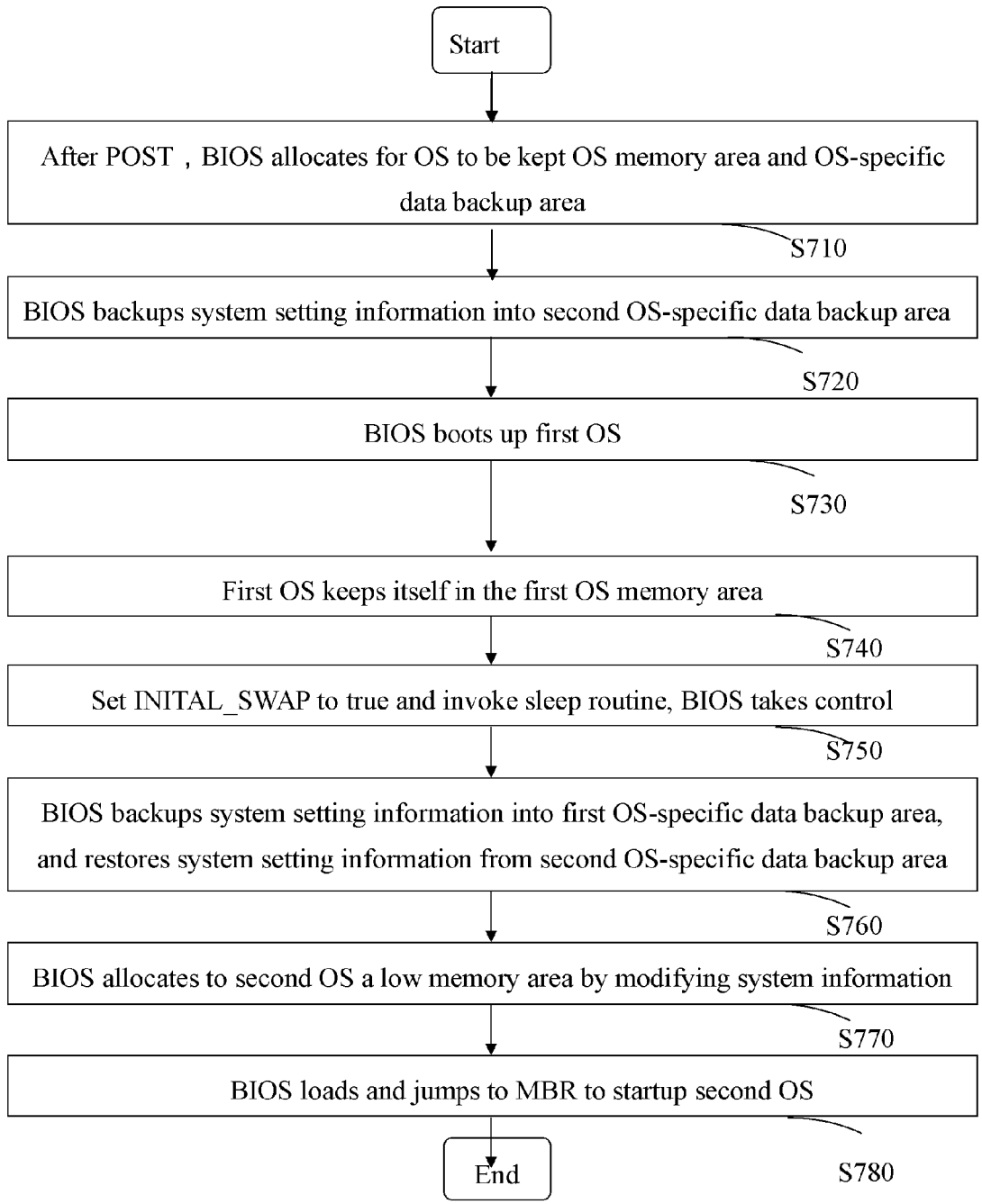
FIG. 7 shows a detailed flow of steps S310-S320 of FIG. 3.

FIG. 7 shows the detailed process of steps S310-S320 of FIG. 3. Referring to FIG. 7, S310 of FIG. 3 includes sub-steps of S710-S740. In sub-step S710, after POST 141 is ended, the memory allocation component 1421 of BIOS 143 allocate memory areas (250, 260) and operating system-specific data backup area (220, 230) for operating systems to be kept in RAM 120.

At sub-step S720, the backup and restore component 1422 of BIOS 143 backup the computer system setting information into the allocated second operating system-specific data backup area 220.

At sub-step S730, the first operating system is booted by BIOS 143 from a hidden partition on disk.

At sub-step S740, after the first operating system is booted, the first operating system transfers itself to the first operating system memory area 260.

The step S320 of FIG. 3 compromises the sub-step S750. The running first operating system sets INITIAL_SWAP to true, and then invoke the swap routine to let BIOS take control.

The step S330 of FIG. 3 includes sub-steps of S760-S780. At sub-step S760, the backup and restore component 1422 of BIOS 143 backups the computer system setting memory area 210 of the first operating system into the first operating system-specific data backup area 230; then the backup and restore component 1422 of BIOS 143 restores the original computer setting information, i.e. restore the computer setting information in the second operating system-specific data backup area 220 into the computer system setting memory area 210.

At sub-step S770, operating systemC 142 sets the first operating system memory area 260 as a memory hole, or hooks BIOS 15H to modify the memory size. In particular, for MS Windows, the maximum physical memory size can be specified by adding a "maxmem" or "MM" entry in boot.ini.

At sub-step S780, operating systemC 142 loads and jumps to MBR to startup the second operating system.

While the above describes the general idea of the invention, now an example will be given for a particular modification of the boot loader patch routine. Firstly, in the case of Linux (kernel 2.4) operating system, modify the boot loader patch routine to set up the first operating system.

Figure 8:
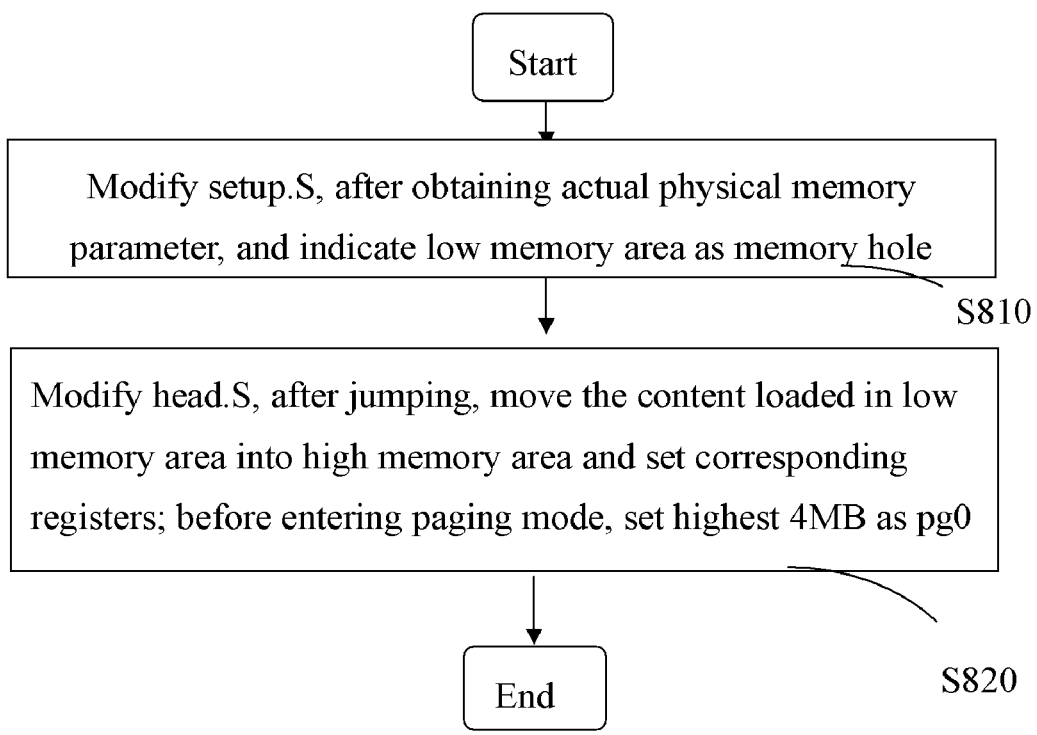
FIG. 8 shows a flowchart of setting up the boot loader patch routine of the first operating system of the invention in the case of Linux operating system.

FIG. 8 shows the flowchart of modification of standard Linux operating system into the first operating system. Referring to FIG. 8, at S810, modify setup.S. Indicate the low memory area (the second operating system memory area) as a memory hole after obtaining the actual physical memory parameters and before initializing the register for protected mode. At S 820, modify head.S. After jumping to the predetermined address, move the content in the low memory area into the high memory area, and correspondingly set respective registers. Before entering into paging mode, set the highest 4 MB of the physical memory as pg0.

Secondly, in the case of MS Windows 2000, modify the boot loader patch routine to set up the first operating system.

Figure 9:
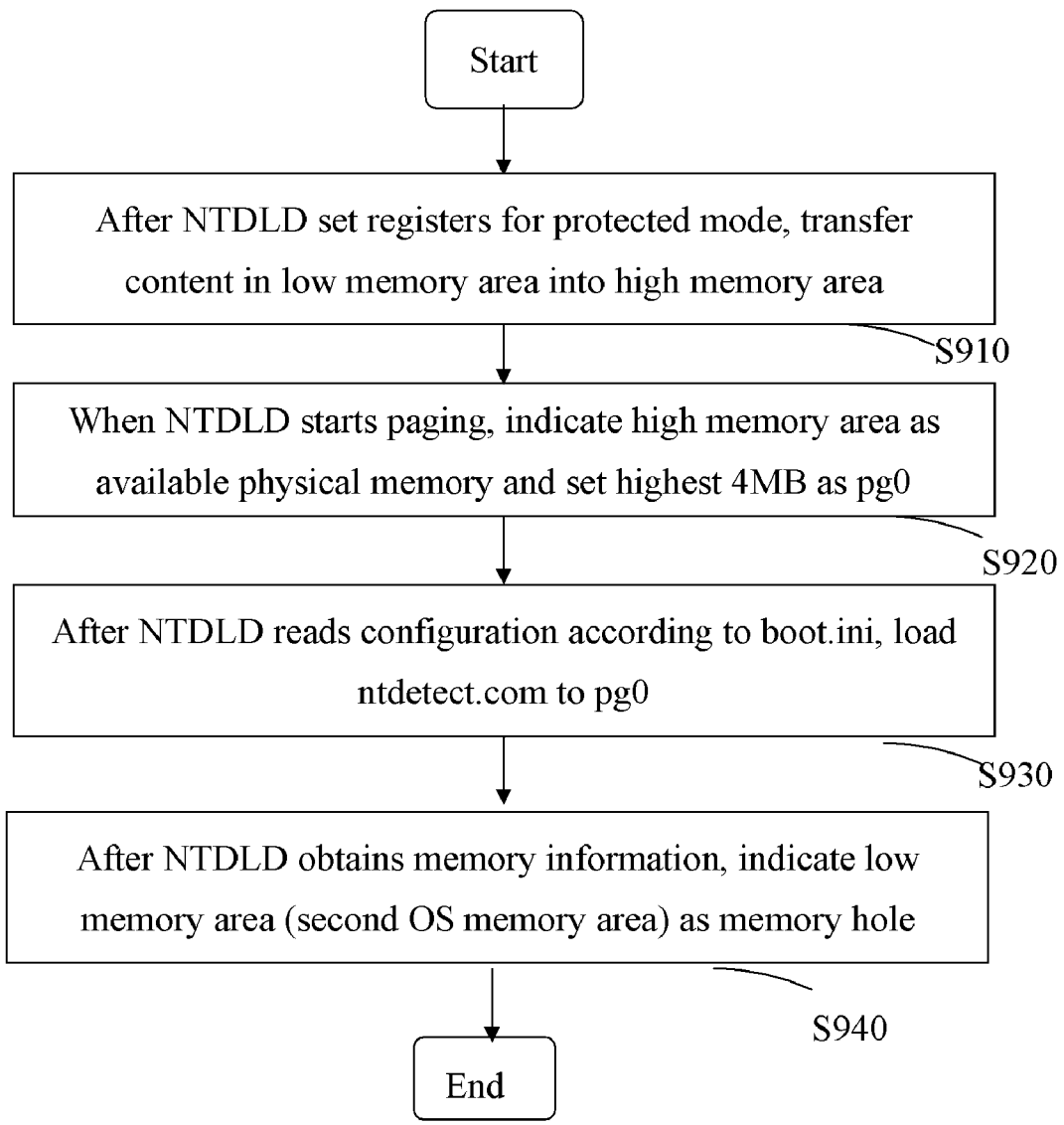
FIG. 9 shows a flowchart of setting up the boot loader patch routine of the first operating system of the invention in the case of MS Windows 2000.

FIG. 9 shows the flowchart of modification of MS Windows 2000 into the first operating system. Referring to FIG. 9, at S910, after NTDLD sets the register for protected mode, transfer the content loaded in the low memory area into higher memory area; at S920, when NTDLD starts paging, indicate the high memory area as the available physical memory and set the highest 4 MB as pg0; at S930, after NTDLD reads the configuration from boot.ini, load ntdetect.com into pg0; at S940, after NTDLD obtains the memory information, indicate the low area (the second operating system memory area) as a memory hole.

As described above, in this invention, the first operating system is set up by modifying a common operating system. The first operating system and the second operating system can run in total independence of each other and can also provide management functions. By this invention, one can swap among multiple operating systems in a convenient and swift way with little memory cost.

Although the invention is illustrated and described by means of particular embodiments, a person well trained in the art can appreciate that various modifications of operating systems in the forms and details of these embodiments without departing from the spirit and scope of the invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A computer system comprising:
at least two operating systems coexisting independently of each other, said computer system further comprising a random access memory and a basic input output system (BIOS) stored in read-only memory, with the BIOS including a power-on self test routine to invoke a first operating system from said at least two operating systems to be an invoked operating system when said first operating system is without a fault, and to invoke another operating system from said at least two operating systems to be the invoked operating system when said first operating system is with the fault, and each of the operating systems including a boot loader routine and a suspension routine;
an operating system swap core in the BIOS that includes a memory allocation component invoked by the power-on self test routine upon the computer system startup to allocate a random access memory area for each of the operating systems, and a backup and restore component invoked by the suspension routine to backup and restore data specific to each of the operating systems,
wherein each of the operating systems further includes a boot loader patch routine to transfer each corresponding operating system to memory area allocated by the operating system swap core and set allocated memory area as a physical memory available for the corresponding operating system; and each of the operating systems further comprising a swap routine to set swap parameters and invoke a suspension routine in the corresponding operating system to give system control to the operating system swap core, such that said computer system is enabled to swap between the operating systems when said invoked operating system is subject to a virus attack or crash due to one of: a fault, a deletion of files, and formatting of logical disk drives.

2. A computer system as claimed in claim 1, wherein the computer system is an i386-based architecture with Advanced Configuration and Power Interface.

3. A computer system as claimed in claim 1, wherein the computer system has two operating systems coexisting in the random access memory.

4. A computer system as claimed in claim 1, wherein the operating systems are of a same type of operating system.

5. A computer system as claimed in claim 1, wherein the memory allocation component allocates in the random access memory the same number of operating system memory areas as that of the operating systems and the same number of operating system-specific data backup areas as that of the operating systems, with the operating system memory areas acting as a random access memory for the operating systems and the operating system-specific data backup areas acting to store current setting information of a respective operating system for the computer system.

6. A computer system as claimed in claim 5, wherein the backup and restore component further includes a suspension swap routine for loading Master Boot Record by the operating system swap core and for jumping to Master Boot Record during the initial operating system swap, while during a non-initial operating system swap, the operating system swap core backups the setting information of a current operating system for the computer system into the corresponding operating system-specific backup area, then restores the setting of another operating system for the computer system and wakes up the another operating system, and then jumps to the waken-up operating system.

7. A computer system as claimed in claim 5, wherein the memory allocation component allocates in the highest memory area a first operating system memory area as the random access memory for a first operating system, and allocates in a low memory area a second operating system memory area as the random access memory for a second operating system.

8. A computer system as claimed in claim 7, wherein the boot loader patch routine of the first operating system comprises at least one of loading and moving the first operating system into the first operating system memory area allocated by the memory allocation component, setting a used indicator for the second operating system memory area to ensure that the second operating system memory area will neither be written into by the first operating system nor transferred by the first operating system to a swap partition on disk, indicating the second operating system memory area as a memory area read only by some system management applications, and registering to the first operating system a swap routine that implements swap service.

9. A computer system as claimed in claim 8, wherein the swap routine of the first operating system is used to invoke the suspension routine in the first operating system after the swap parameters are set.

10. A computer system as claimed in claim 9, wherein the boot loader patch routine of the second operating system is configured to transfer the second operating system into the second operating system memory area allocated by the operating system swap core, and register to the second operating system a swap routine that implements swap service.

11. A computer system as claimed in claim 10, wherein the swap routine of the second operating system is configured to invoke the suspension routine in the second operating system after the swap parameters are set.

12. A method comprising:
hosting at least two operating systems independently from each other on a computer system and enabling swapping between the operating systems, with the computer system including a random access memory and a BIOS stored in a read-only memory and the BIOS including a the power-on self test routine, and each of the operating systems including a boot loader routine and a suspension routine, the step of hosting comprising the following steps:
1) providing an operating system swap core in the BIOS to allocate a RAM area for each of the operating systems upon the computer system startup and to be invoked by the suspension routine to backup and restore data specific to each of the operating systems;
2) upon the power-on self test, using the operating system swap core to allocate in the random access memory for each of the operating systems a respective operating system memory area as a random access memory for the operating system;
3) after the power-on self test, using the operating system swap core to backup an original setting information of the computer system;
4) according to the original setting information, starting up a first operating system, which will transfer itself into the operating system memory area allocated to the first operating system;
5) using the operating system swap core to backup the current setting of the computer system, and then restoring the original setting information of the computer system, without the power-on self test and according to the original information starting up a second operating system, which will transfer itself into the operating system memory area allocated to the second operating system;
6) repeating step 4) to startup the remaining operating systems until all the operating systems have been sequentially started up; and
7) providing in the current operating system a swap routine to invoke the suspension routine to give control of the computer system to the operating system swap core in order to backup the current operating system preparing to suspension and restore the setting information for the computer system of another operating system ready to wake up, thus waking up the another operating system.

13. The method as claimed in claim 12, wherein the computer system is an i386-based architecture with ACPI.

14. The method as claimed in claim 12, wherein the step 2) further includes using the operating system swap core to allocate upon the power-on self test in the random access memory for each of the operating systems a respective operating system-specific data backup area to keep the current setting information for the computer system of respective operating system.

15. The method as claimed in claim 14, wherein the step 3) further includes keeping the original setting information for the computer system in a second operating system-specific data backup area.

16. The method as claimed in claim 15, wherein steps 4) and 6) both include invoking after the starting up the swap routine of the operating system to give control of the computer system to the operating system swap core.

17. The method as claimed in claim 12, wherein the computer system has two operating systems coexisting in the random access memory.

18. The method as claimed in claim 12, wherein the operating systems are of the same type of operating system.

19. The method as claimed in claim 12, wherein the step 7) further includes using the operating system swap core during the initial operating system swap to load and jump to the Master Boot Record and using the operating system swap core during a non-initial operating system swap to backup the setting information of current operating system for the computer system into the corresponding operating system-specific backup area, then restore the setting of another operating system and wake up the another operating system, and then jump to the waken-up operating system.

20. The method as claimed in claim 12, wherein the memory area to keep the first operating system is in the highest memory area of the random access memory and the memory area to keep the second operating system is in a low memory area of the random access memory.

21. The method as claimed in claim 12, wherein the step 4) includes:
providing in the boot loader routine of the first operating system a boot loader patch routine;
using the boot loader patch routine to load and/or transfer the first operating system into the first operating system memory area;
using the boot loader patch routine to set a used indicator for the second operating system memory area to ensure that the second operating system memory area will neither be written into by the first operating system nor transferred by the first operating system to a swap partition on disk; and
using the boot loader patch routine to indicate the second operating system memory area as a memory area read only by some system management applications, and register to the first operating system a swap routine that implements swap service.

22. The method as claimed in claim 21, wherein the step 5) further includes:
providing in the boot loader routine of the second operating system a boot loader patch routine; and
using the boot loader patch routine to transfer the second operating system into the second operating system memory area allocated by the operating system swap core, and register to the second operating system a swap routine that implements swap service.

23. An article of manufacture comprising a computer usable medium having computer readable program code means embodied therein for causing hosting of at least two operating systems, the computer readable program code means in said article of manufacture comprising computer readable program code means for causing a computer to effect the steps of:
hosting at least two operating systems independently from each other on a computer system and enabling swapping between the operating systems, with the computer system including a random access memory and a BIOS stored in a read-only memory and the BIOS including a the power-on self test routine, and each of the operating systems including a boot loader routine and a suspension routine, the step of hosting comprising the following steps:
1) providing an operating system swap core in the BIOS to allocate a RAM area for each of the operating systems upon the computer system startup and to be invoked by the suspension routine to backup and restore the data specific to each of the operating systems;

2) upon the power-on self test, using the operating system swap core to allocate in the random access memory for each of the operating systems a respective operating system memory area as a random access memory for the operating system;

3) after the power-on self test, using the operating system swap core to backup the original setting information of the computer system;

4) according to the original setting information, starting up a first operating system, which will transfer itself into the operating system memory area allocated to the first operating system;

5) using the operating system swap core to backup the current setting of the computer system, and then restoring the original setting information of the computer system, without the power-on self test and according to the original information starting up a second operating system, which will transfer itself into the operating system memory area allocated to the second operating system;

6) repeating step 4) to startup the remaining operating systems until all the operating systems have been sequentially started up; and 7) providing in the current operating system a swap routine to invoke the suspension routine to give control of the computer system to the operating system swap core in order to backup the current operating system preparing to suspension and restore the setting information for the computer system of another operating system ready to wake up, thus waking up the another operating system.

24. A program storage device readable by machine, tangibly embodying a program of instructions executable by the machine to perform method steps for hosting at least two operating systems, said method steps comprising the steps of claim 12.

25. A computer program product comprising a computer usable medium having computer readable program code means embodied therein for causing functions of a computer system, the computer readable program code means in said computer program product comprising computer readable program code means for causing a computer to effect the functions of claim 1.

* * * * *

UNITED STATES PATENT AND TRADEMARK OFFICE
CERTIFICATE OF CORRECTION

PATENT NO. : 7,409,536 B2  
APPLICATION NO. : 11/061396  
DATED : August 5, 2008  
INVENTOR(S) : Xiao Bing Guo et al.

Page 1 of 1

It is certified that error appears in the above-identified patent and that said Letters Patent is hereby corrected as shown below:

Title Page, Item (73) Assignee should read

--LENOVO (SINGAPORE) PTE LTD,  
7, CHANGI BUSINESS PARK CENTRAL 1  
SINGAPORE 486048, SINGAPORE--

Signed and Sealed this

Fifteenth Day of September, 2009

David J. Kappos  
*Director of the United States Patent and Trademark Office*